United States Patent [19]

Garkisch et al.

[11] 3,873,577

[45] Mar. 25, 1975

[54] METHOD OF RECOVERING PURE MALEIC ANHYDRIDE FROM A CRUDE MIXTURE CONTAINING SAME TOGETHER WITH AN ENTRAINER

[75] Inventors: Otto Ludwig Garkisch, Neuenhain; Günther Ibing, Gladbeck; Günther Kammholz, Gelsenkirchen-Buer; Hermann Schirrmacher, Gladbeck; Kurt Lohbeck, Bottrop, all of Germany

[73] Assignees: Verba-Chemie AG, Gelsenkirchen-Buer; Metallgesellschaft AG, Frankfurt am Main, Germany; part interest to each

[22] Filed: Dec. 13, 1971

[21] Appl. No.: 207,024

[30] Foreign Application Priority Data
Dec. 12, 1970 Germany............................ 2061336

[52] U.S. Cl........................................ 260/346.8 M
[51] Int. Cl............................................ C07c 57/14
[58] Field of Search............................ 260/346.8 M

[56] References Cited
UNITED STATES PATENTS

| | | | |
|---|---|---|---|
| 2,340,490 | 2/1944 | Porter............................ | 260/346.8 |
| 3,357,994 | 12/1967 | Popp et al...................... | 260/346.8 |
| 3,642,829 | 2/1972 | Weyens........................... | 260/346.8 |

*Primary Examiner*—Henry R. Jiles
*Assistant Examiner*—Bernard I. Dentz
*Attorney, Agent, or Firm*—Karl F. Ross; Herbert Dubno

[57] ABSTRACT

A process for recovering pure maleic anhydride, present in a crude mixture with an azeotropic entrainer and derived from the catalytic oxidation of benzene or $C_4$ hydrocarbons, which comprises heating the mixture to decompose any residual maleic acid to maleic anhydride and water which is tied to or accompanies the entrainer, distilling the mixture in a column to recover the entrainer and water phase from the head of the column and produce a sump product free from the entrainer phase and distilling the sump product to recover the pure maleic anhydride.

7 Claims, 1 Drawing Figure

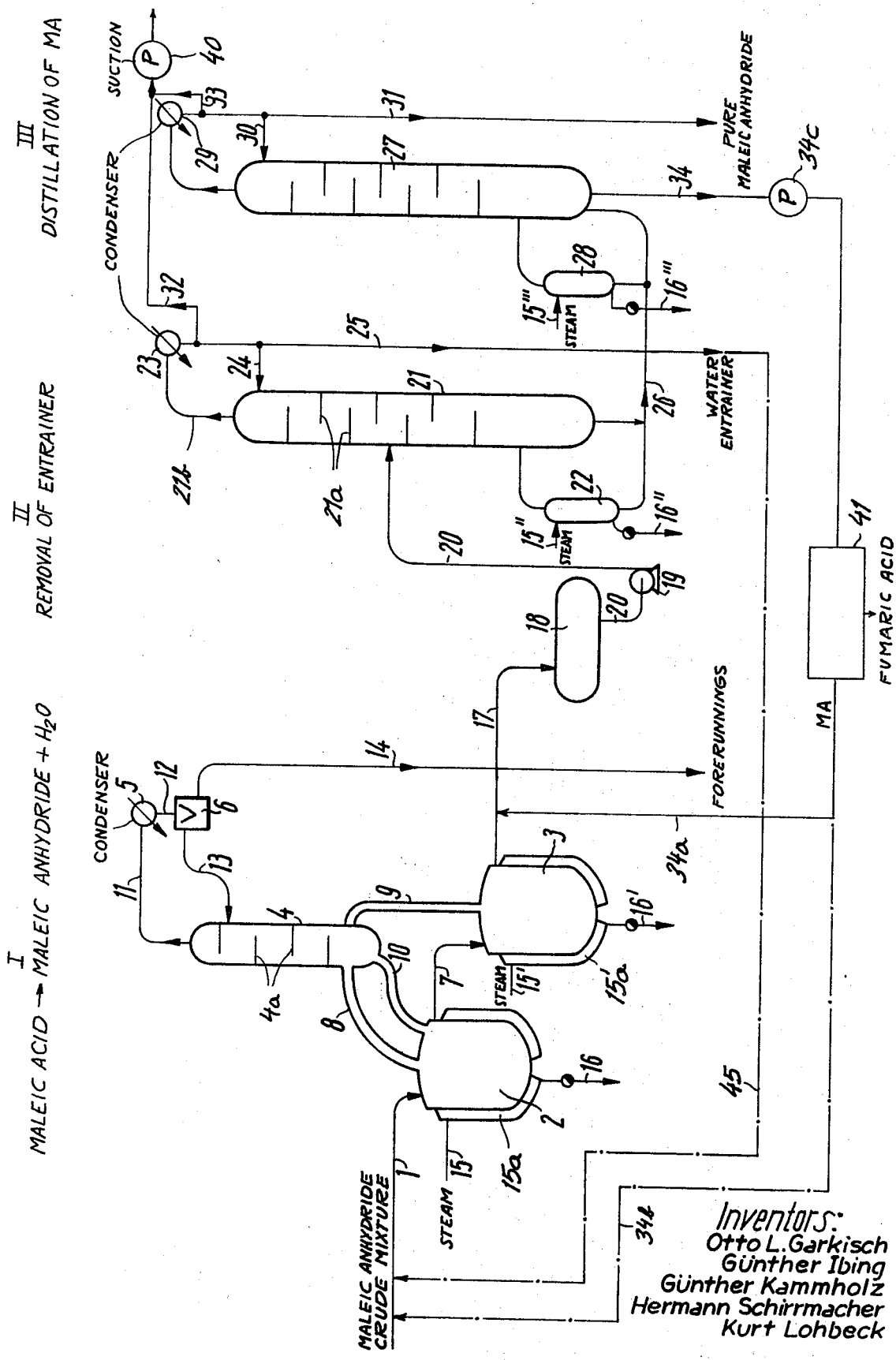

METHOD OF RECOVERING PURE MALEIC ANHYDRIDE FROM A CRUDE MIXTURE CONTAINING SAME TOGETHER WITH AN ENTRAINER

FIELD OF THE INVENTION

Our present invention relates to a process for the recovery of pure maleic anhydride from crude maleic anhydride mixtures, generally containing some maleic acid and possible an aqueous phase, in the presence of a water entrainer. More particularly, the invention relates to the recovery of maleic anhydride of high purity, free from hydrophilic phases and organic contaminants.

BACKGROUND OF THE INVENTION

Maleic anhydride, which is commonly used in the synthesis of dienes by the Diels-Alder reaction, for copolymerization in the production of alkyd resins, and for the manufacture of industrial and agricultural chemicals including Malathion, has been produced on a commercial scale heretofore by a vapor-phase oxidation of benzene or $C_4$ hydrocarbons.

The product of this method can be a mixture of the products of direct condensation (liquefaction) of maleic anhydride, dehydration of maleic acid with an entrainer or a mixture of products of the direct dehydration of the maleic-acid phase in the presence of an entrainer. The term "entrainer" in used herein in its usual organic-chemistry sense to identify a substance having a high affinity for one component of a mixture and capable of forming an azeotrope therewith to induce a transfer of water from, say, one organic phase to a second phase which is at least in part an aqueous phase produced by the presence of the entrained water. The entrainer can chemically react with the water or may retain the water by physical entrapment, or otherwise may hold the water molecules by bonding which is weaker than chemical bonding. In most maleic anhydride processes in which vapor-phase oxidation of benzene or $C_4$ hydrocarbons is carried out, the crude mixture resulting contains maleic anhydride and an entrainer phase containing the entrainer, water entrained thereby and associated impurities. The maleic anhydride phase or component may contain residual maleic acid and other organic impurities.

In conventional processes for recovering pure maleic anhydride or maleic anhydride of high purity, care must be taken to avoid excessive steric rearrangement of the residual maleic acid into fumaric acid. Conventional processes, moreover, have generally been discontinuous and have involved a heating of the impure or crude mixture for prolonged periods followed by distillation of low-boiling-point organic impurities and subsequent removal of the entrainer. In discontinuous processes, however, most of the residual maleic acid is converted to fumaric acid, thereby resulting in a loss of starting material and producing a resinous deposit which may interfere with the use of equipment. Furthermore, discontinuous processes of this type can only be carried out in low-volume batches. While a continuous distillation has been provided for the recovery of pure maleic anhydride, the proposal does not appear to take into consideration the presence of residual maleic acid so that the formation of fumaric acid by steric rearrangement remains a problem. The industry has consequently long sought a method of obtaining maleic anhydride of high purity which will be free from the problem of fumaric acid formation.

OBJECTS OF THE INVENTION

It is the principal object of the present invention to provide an improved process for the recovery of pure maleic anhydride from a crude mixture containing same in the presence of an entrainer, whereby the above-mentioned disadvantages are avoided.

It is another object of our invention to provide an improved method of obtaining pure maleic anhydride in high yield, with minimum loss of raw material and without the problem hitherto encountered in the formation of fumaric acid from residual maleic acid.

Still another object of the invention is to provide an improved method of recovering maleic anhydride from a crude mixture containing same in high purity by simple and economic means.

Still further, it is an object of our invention to provide a process for the recovery of high-purity maleic anhydride which avoids the disadvantages of discontinuous methods of treating crude mixtures of maleic anhydride and a water entrainer and which is also capable of obviating the formation of fumaric acid and crusts therefrom, while permitting the process to be carried out in large plants on a large scale with considerable efficiency and economy.

SUMMARY OF THE INVENTION

These objects and others which will become apparent hereinafter, are attained in a three-stage process for the recovery of pure maleic anhydride from a crude mixture containing same in the presence of a water entrainer and residual maleic acid, which comprises the steps of decomposing the maleic acid in the mixture by heat to form maleic anhydride and water and recovering a forerunning therefrom, column-distilling the resulting mixture to remove the entrainer and the water carried thereby from the head of the column and produce a sump product or residue, and distilling the sump product continuously — preferably in a column — to recover the pure maleic anhydride from the vapor phase distilled from the sump product.

The crude mixture of maleic anydride, residual maleic acid and other impurities and the water entrainer may be any of those produced in systems for making maleic anhydride or maleic acid, or systems for converting maleic acid to maleic anhydride by dehydration. The mixture may also be formed by introducing the water entrainer into a mixture of maleic acid and maleic anhydride.

We have found that the sump product of the third stage, in which the pure maleic anhydride is recovered from the distilled vapors, consists of a small proportion of maleic anhydride, some fumaric acid and various resinous constituents. At this stage, however, the maleic anhydride condensed from the vapor phase, is already of high purity so that the residue cannot interfere with large-scale purification.

According to another feature of the invention, the first step is carried out at a higher pressure than is sustained in the two subsequent steps and preferably at an absolute pressure between 100 millimeters of mercury (mm Hg or torr.) and atmospheric pressure. In the second and/or third stage, the absolute pressure is held between 60 and 500 mm Hg, the pressure in the first stage being higher than that of the second stage. It has also been found to be advantageous in some cases to provide a superatmospheric pressure in the first stage, e.g., an aboslute pressure of up to 5 atmospheres (3,800 mm Hg or torr.).

Still another feature of the invention resides in the use of a cascade of at least two operating stages in the initial step of the present invention wherein the maleic acid contained in the crude mixture is split into maleic anhydride and water. In the cascade arrangement, the water eliminated from the acid is removed together with the low-boiling-point organic constituents as a forerun in a column in which the rising vapors are cooled and the aqueous phase is recovering through a valve arrangement. The condensed entrainer, recovered from the second step of the process is preferably recycled to the first step so as to assist in trapping the water split from the residual maleic acid. In the cascade, the temperature is controlled to maintain a rising temperature gradient along the particular stage of the cascade and its column according to still another feature of the invention. The maleic anhydride of the third-step residue is preferably returned to one of the earlier stages to increase the economy of the process.

DESCRIPTION OF THE DRAWING

The above and other objects, features and advantages of the present invention will become more readily apparent from the following description, reference beieng made to the accompanying drawing the sole FIGURE of which is a flow diagram illustrative of the invention.

SPECIFIC DESCRIPTION

In the drawing, we show a conduit 1 for feeding a crude mixture containing maleic anhydride, a water entrainer such as xylene, residual maleic acid and associated inorganic impurities into the first stage 2 of a cascade as described above. The cascade forms part of the first step of the process represented at I of the drawing. A second stage of the cascade is represented at 3, both stages having a common column 4 provided with a condenser 5 and a separator 6. An overflow conduit 7 links the first-stage vessel 2 directly to the second-stage vessel 3 while tubes 8 and 9 conduct the vapors from both stages of the cascade to the base of the fractional-distillation column 4 the stages of which are represented at 4a. A drain conduit 10 leads condensed vapors from the column 4 into the first stage vessel 2.

The condenser 5 is connected to the head of the column 4 by a conduit 11, the condenser 5 being provided with a drain 12 by which the condensate is led into the separator 6. The latter is a valve selectively passing forerunning into the conduit 14 and thereafter returning condensate at 13 to the column 4 in a reflux path.

Steam-supply conduits 15 and 15' lead into respective jackets 15a and 15a' of vessels 2 and 3 which are provided with drain conduits 16 and 16' for removing condensate from the heating jackets.

From the second stage 3 of the cascade, a conduit 17 leads to a storage vessel or reservoir 18 which feeds via line 20 a pump 19 delivering the mixture to step II of the process. The pump 19 feeds the mixture via line 20a to an intermediate point along the height of a fractional distillation column 21 whose reboiler 22 is provided with a steam-feed line 15'' and a condensate return line 16''. The vapors within the distillation column 21 rise through the stages 21a and emerge at a vapor outlet 21b to pass into a condenser 23 provided with a reflux conduit 24 and a drain conduit 25 by which the water entrainer is removed from the system. The sump product can be led via line 26 to the third-stage apparatus which includes the distillation column 27. Line 32 and line 33 leading to the heads of columns 21 and 27 are connected to a suction pump 40 adapted to maintain a pressure within these columns which is less than the pressure in the first step of the system, i.e., in column 4 and cascade vessels 2 and 3.

The reboiler 28 of column 27 is supplied with steam via line 15''' and condensate removal is effected via line 16''', the steam passing through the usual tubular coil of the reboiler so as to generate vapors of the maleic anhydride composition which rise in column 27. The sump product 34, consisting of maleic anhydride, fumaric acid, etc., may be returned to an earlier stage of the process as shown at 34a or 34b by pump 34c for greater yield of maleic anhydride. The pure maleic anhydride is recovered via line 31 from a condenser at the head of the column. The condenser 29 also is connected in a reflux path via conduit 30 as previously described.

SPECIFIC EXAMPLES

EXAMPLE I

Benzene is catalytically oxidized with air, whereupon the gases are cooled to eliminate about 50 percent by weight of the raw maleic anhydride containing a residue of 3 percent by weight maleic acid. The remainder of the maleic anhydride is passed through a scrubbing tower in which it is removed in an aqueous phase to form a 40 percent aqueous solution of maleic acid. The maleic acid is treated in a dehydrating column of xylene (water entrainer capable of forming an azeotrope with water) to recover the pure maleic anhydride which has a residue of about 3 percent by weight maleic acid. The sump product consists approximately of 60 percent by weight raw maleic anhydride and 40 percent by weight of the entrainer (xylene and aqueous phase associated therewith). The two raw maleic anhydride fractions, produced by direct condensation and produced by dehydration as described are fed together via conduit 1 to the first stage cascade vessel 2. This crude mixture consists of about 80 percent by weight of a raw maleic anhydride fraction containing 3 percent maleic acid and 20 percent by weight of an entrainer fraction most of which is xylene isomers.

The vessels 2 and 3 through which the mixture is passed, are heated with steam to a temperature and for a period (residence time) adjusted such that the liquid delivered at 17 to the reservoir 18 consists substantially exclusively of maleic anhydride and the entrainer or xylene phase, contain substantially no residual maleic acid and have a fumaric acid concentration of less than 0.5 percent by weight. The cascade 2,3,4, is operated under atmospheric pressure (approximately 760 mm Hg), the temperature in vessel 2 is maintained at about 164°C and the temperature in vessel 3 is maintained at about 169°C. The system is refluxed via condenser 5 and return line 13 and the distillation column 4. The condensed entrainer returns during refluxing to vessel 2 via line 10 and the valve 6 is set so that a forerun is removed at 14 prior to refluxing via line 13. The forerun appears to remove a major part of any maleic acid which is not split up into maleic anhydride and water, resin-forming components which otherwise then to impede the process and possibly fumaric acid.

The mixture which is free from maleic acid and the other low-boiling organic impurities, and which consists of maleic anhydride, the entrainer, some residual fumaric acid and resinous high-boiling constituents, flow into the reservoir 18 and is then passed into the column 21.

In this column, the entrainer is stripped from the mixture as the vapor phase and is removed at the head of the column via line 25, a portion of the entrainer being refluxed from the condenser 23 via line 24. The reflux ratio is 3.5. A vacuum pump or steam injector, connected to the column at 32, maintains a pressure of 300 mm Hg in this column.

The entrainer-free sump product is supplied via line 26 to the column 27 which is operated with a reflux ratio of 0.5 and from which the pure maleic anhydride is withdrawn at 31. The vacuum pump or steam injector connected to the system at 33, maintains a pressure of about 70 mm Hg in the column 27, i.e., a pressure less than that in the first or second steps of the process. About 5 percent of the raw maleic anhydride supplied at 1, is found in the sump product recovered at 34 which contains 24 percent by weight fumaric acid and 76 percent by weight maleic anhydride. This mixture is withdrawn and distilled in a squeeze-out flask or the like represented at 41 which separates the maleic anhydride from the fumaric acid. The maleic anhydride is supplied to an earlier stage of the process as indicated via lines 34a and 34b.

EXAMPLE II

A hydrocarbon mixture of $C_4$ compounds, especially butene-1 and butene-2 making up by weight 75 percent of the mixture is catalytically oxidized with air by conventional maleic-anhydride-production procedures. When the gases produced by the reaction are cooled the raw maleic anhydride remaining in the gaseous phase is transformed into a 40 percent aqueous solution of maleic acid in a scrubbing tower. In the dehydrating column, the aqueous maleic acid solution is treated with orthoxylene as an entrainer to recover the raw maleic anhydride with a residue of 2.5 percent maleic acid.

The sump product consists of a mixture of crude maleic anhydride containing a residue of maleic acid and the xylene entrainer, the latter being present in an amount of about 40 percent by weight. This mixture is fed into the first-stage vessel 2 of the cascade and then into the second-stage vessel 3, the vessels being heated with steam to a temperature of 162°C in vessel 2 and 170°C in vessel 3. The pressure in the system is maintained at 0.8 kg/cm² above atmospheric pressure. These temperatures are sufficient to produce a mixture substantially free from maleic acid and low-boiling impurities and with a residue of 0.5 percent fumaric acid upon discharge into the reservoir 18.

The water which is released upon the splitting of the maleic acid and the low-boiling-point impurities, rise through the column 4, are condensed at 5 and are discharged with the forerun at 14. The condensed entrainer is refluxed via line 10 to the first stage.

The maleic anydride mixture, containing xylene, residual fumaric acid and high-boiling resinous components, is fed to the column 21 which is heated with steam as previously described. At the top of the column the pressure is maintained at 400 mm Hg as already described. The entrainer is thereby removed and the maleic anhydride residue supplied to column 27 from which the maleic anhydride is recovered under the conditions set forth in Example I. Line 45 represents recycling of the condensed entrainer from step II to the input conduit 1 of the first step of the process.

The improvement described and illustrated is believed to admit of many modifications within the ability of persons skilled in the art, all such modifications being considered within the spirit and scope of the invention except as limited by the appended claims:

We claim:

1. A maleic anhydride purification process comprising the steps of:
   a. deriving a crude mixture of mostly maleic anhydride, with maleic acid as an impurity and a xylene entrainer from a system for the catalytic oxidation of benzene or a $C_4$ hydrocarbon after dehydration;
   b. heating said mixture in at least two stages in cascade to split the maleic acid therein into maleic anhydride and water and producing a vapor from said mixture, while removing a forerunning of said vapor therefrom consisting of water and low boiling organic impurities, thereby producing a further mixture, said stages being carried out in agitation vessels wherein the pressure is maintained between 100 mm Hg and slightly above atmospheric pressure;
   c. subjecting said further mixture from step (b) to column distillation to evaporate said xylene entrainer, and recovering said xylene entrainer from the head of the column of the distillation of the mixture produced in step (b) while producing a sump product substantially free from said xylene entrainer wherein the pressure ranges from between 60 and 500 mmHg; and
   d. continuously distilling from said sump product pure maleic anhydride and recovering the maleic anhydride from a vapor phase above said sump product wherein the pressure ranges from between 60 and 500 mmHg, step (b) being carried out at a higher pressure than steps (c) and (d).

2. The process defined in claim 1 wherein the entrainer removed in step (c) is condensed and recycled to step (b).

3. The process defined in claim 1, further comprising the steps of maintaining a rising temperature gradient in at least one of said stages.

4. The process defined in claim 1, further comprising the step of obtaining a maleic-anhydride residue upon distillation in step (d), removing maleic anhydride from said residue and recycling the maleic anhydride removed from said residue to step (b).

5. The process defined in claim 1, further comprising the step of obtaining a maleic-anhydride residue upon distillation in step (d), removing maleic anhydride from said residue and recycling the maleic anhydride removed from said residue to step (c).

6. The process defined in claim 1, further comprising the steps of refluxing vaporized entrainer in step (b) subsequent to the removal of the forerunning, refluxing the entrainer in step (c) during the removal of the entrainer, and refluxing the maleic anhydride in step (d) during the distillation thereof.

7. The process defined in claim 1 wherein step (b) is carried out at a superatmospheric pressure.

* * * * *